US007797091B2

(12) United States Patent
Inoue et al.

(10) Patent No.: US 7,797,091 B2
(45) Date of Patent: Sep. 14, 2010

(54) ROLLOVER JUDGMENT APPARATUS

(75) Inventors: Satoru Inoue, Tokyo (JP); Katsuaki Yasui, Tokyo (JP); Takashi Tokunaga, Tokyo (JP); Ryoutarou Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 427 days.

(21) Appl. No.: 11/795,580

(22) PCT Filed: Dec. 27, 2005

(86) PCT No.: PCT/JP2005/023943

§ 371 (c)(1),
(2), (4) Date: Jul. 19, 2007

(87) PCT Pub. No.: WO2006/112094

PCT Pub. Date: Oct. 26, 2006

(65) Prior Publication Data

US 2008/0114509 A1    May 15, 2008

(30) Foreign Application Priority Data

Apr. 1, 2005    (JP) .............................. 2005-106412

(51) Int. Cl.
*B60R 21/017*    (2006.01)
*B60R 21/01*    (2006.01)

(52) U.S. Cl. ............................... 701/45; 701/1; 701/38; 340/429; 340/440; 280/735; 180/282

(58) Field of Classification Search .................. 701/36, 701/38, 45, 46, 70; 180/282; 280/735; 340/40, 340/440
See application file for complete search history.

(56) References Cited

U.S. PATENT DOCUMENTS 5,658,011 A * 8/1997 Byon .......................... 280/735

(Continued)

FOREIGN PATENT DOCUMENTS

CN    1132702 A    10/1996

(Continued)

*Primary Examiner*—Thomas G Black
*Assistant Examiner*—Lin B Olsen
(74) *Attorney, Agent, or Firm*—Birch, Stewart, Kolasch and Birch, LLP

(57) ABSTRACT

A rollover judgment apparatus includes a threshold change functional unit 5 for changing a determination threshold on the basis of a roll angular velocity ω, a tilt angle θv of a vehicle which is acquired by integrating the roll angular velocity ω, a lateral direction acceleration Gy, and a steering wheel angle θs, an ω×θ map judging unit 6 for judging whether or not the vehicle will roll over on the basis of the determination threshold changed by the threshold change functional unit 5, and the tilt angle of the vehicle, a safing functional unit 7 for detecting a tip-up of the vehicle in relation to a motion of the vehicle, and a curtain air bag deploying unit 9 for controlling expansion of a curtain air bag on the basis of an output of the ω×θ map judging unit 6 and an output of the safing functional unit 7.

11 Claims, 7 Drawing Sheets

U.S. PATENT DOCUMENTS

| | | | |
|---|---|---|---|
| 6,315,074 B1 * | 11/2001 | Achhammer et al. | 180/282 |
| 6,438,463 B1 | 8/2002 | Tobaru et al. | |
| 6,694,226 B2 * | 2/2004 | Tobaru et al. | 701/1 |
| 7,222,010 B2 * | 5/2007 | Suzuki et al. | 701/45 |
| 7,236,864 B2 * | 6/2007 | Ogata et al. | 701/38 |
| 7,493,204 B2 * | 2/2009 | Yano | 701/70 |
| 2003/0236603 A1 * | 12/2003 | Lu | 701/37 |
| 2004/0199317 A1 * | 10/2004 | Ogata et al. | 701/45 |
| 2004/0254710 A1 | 12/2004 | Yano | |
| 2005/0004730 A1 * | 1/2005 | Suzuki et al. | 701/38 |
| 2005/0171672 A1 * | 8/2005 | Wallner | 701/70 |
| 2006/0058934 A1 * | 3/2006 | Le et al. | 701/38 |
| 2006/0064218 A1 * | 3/2006 | Subbian et al. | 701/45 |
| 2006/0184299 A1 * | 8/2006 | Wu et al. | 701/45 |

FOREIGN PATENT DOCUMENTS

| | | |
|---|---|---|
| CN | 1576068 A | 2/2005 |
| DE | 10112315 B4 | 1/2000 |
| DE | 60202874 (T2) | 3/2006 |
| DE | 10 2005 042 252 A1 | 4/2006 |
| JP | 8-239007 A | 9/1996 |
| JP | 2001-71787 A | 3/2001 |
| JP | 2001-71844 A | 3/2001 |
| JP | 2001-83172 A | 3/2001 |
| JP | 2002-509831 A | 4/2002 |
| JP | 2003-525166 A | 8/2003 |
| JP | 2005-1522 A | 1/2005 |
| JP | 2005-22553 A | 1/2005 |

* cited by examiner

ROLLOVER JUDGMENT APPARATUS

FIELD OF THE INVENTION

The present invention relates to a rollover judgment apparatus which judges whether or not a vehicle will roll over. Particularly, it relates to a rollover judgment apparatus which adds a rollover prediction function to judgment of an $\omega$–$\theta$ map so as to judge a possibility which the vehicle will roll over at an early time.

BACKGROUND OF THE INVENTION

It is well known that generally a prior art rollover judgment apparatus judges whether a vehicle will roll over when a total of the rotational energy and potential energy of the vehicle exceeds rollover critical energy. This relation can be expressed as the rollover critical curve of an $\omega$ (i.e., a roll angular velocity)-$\theta$ (i.e., a roll angle) map.

Such a prior art rollover judgment apparatus is so constructed as to deploy a curtain air bag in order to prevent any passenger from directly colliding with a side window and a pillar member when a rollover occurs in the vehicle and to prevent any passenger from bursting out of the vehicle to get injured. Therefore, it is necessary to deploy the curtain air bag in the gap between the side window and any passenger (for example, refer to patent references 1 and 2).

[Patent reference 1] JP,2001-71844,A

[Patent reference 2] JP,2001-71787,A

However, in accordance with the energy judgment method as disclosed in the above-mentioned patent application publications, although judgment of whether the vehicle will roll over can be implemented, it is difficult to implement prediction of a passenger's amount of movement which is caused by the inclination and lateral direction acceleration of the vehicle. A problem is therefore that there can be a case in which according to the time when the judgment is carried out, the tip part (or the lower part) of the curtain air bag is caught in a passenger's head or shoulder after the curtain air bag starts developing, and therefore it does not deploy normally and the purpose of protecting passengers cannot be accomplished.

The present invention is made in order to solve the above-mentioned problem, and it is therefore an object of the present invention to provide a rollover judgment apparatus which adds a rollover prediction function to judgment of an $\omega$–$\theta$ map so as to judge a possibility which the vehicle will roll over at an early time.

DISCLOSURE OF THE INVENTION

In accordance with the present invention, there is provided a rollover judgment apparatus for judging whether or not a vehicle will roll over by comparing each of an output of a roll angular velocity sensor and an output of either or both of a lateral direction acceleration sensor and a steering wheel angle sensor with a threshold, the device including: a threshold change functional unit for changing the determination threshold on a basis of a roll angular velocity, a tilt angle of the vehicle which is acquired by integrating the roll angular velocity, and either or both of a lateral direction acceleration and a steering wheel angle; a rollover judging means for judging whether or not the vehicle will roll over on a basis of the determination threshold changed by the threshold change functional unit, and the tilt angle of the vehicle; a safing functional unit for detecting a tip-up of the vehicle in relation to a motion of the vehicle; and a curtain air bag deploying unit for controlling expansion of a curtain air bag on a basis of an output of the rollover judging means and an output of the safing functional unit.

Therefore, the present invention offers an advantage of being able to deploy the curtain air bag normally by adding the rollover prediction function to judgment of the $\omega$–$\theta$ map so as to make the rollover judgment apparatus judge a possibility that the vehicle will roll over at an early time. The present invention offers another advantage of being able to make it possible to carry out early rollover judgment and to detect a lift (or tip-up) of one or more tires on one side of the vehicle off a road surface.

PREFERRED EMBODIMENTS OF THE INVENTION

In accordance with the present invention, a rollover prediction function is added to judgment of an $\omega$ (i.e., a roll angular velocity)-$\theta$ (i.e., a vehicle tilt angle) map so as to make a rollover judgment apparatus judge a possibility that a vehicle will roll over at an early time to deploy a curtain air bag normally.

The rollover prediction function includes a step of extracting features representing the vehicle's behavior which agree with a rollover mode from $\omega$, Gy (a lateral direction acceleration), and a steering operation, and changing a judgment threshold line under certain conditions. A critical angle velocity threshold $\omega$th based on the $\omega$–$\theta$ map is used to judge whether a rollover will occur in the vehicle, and includes no elements about passengers' behavior. On the other hand, when $\omega$ and Gy operate in a direction in which the vehicle is encouraged to roll over, earlier rollover judgment is needed in order to make the curtain air bag operate normally because ω and Gy also operate in a direction in which passengers are moved toward a side of the vehicle.

Hereafter, in order to explain this invention in greater detail, the preferred embodiments of the present invention will be described with reference to the accompanying drawings.

Embodiment 1

Figure 1:
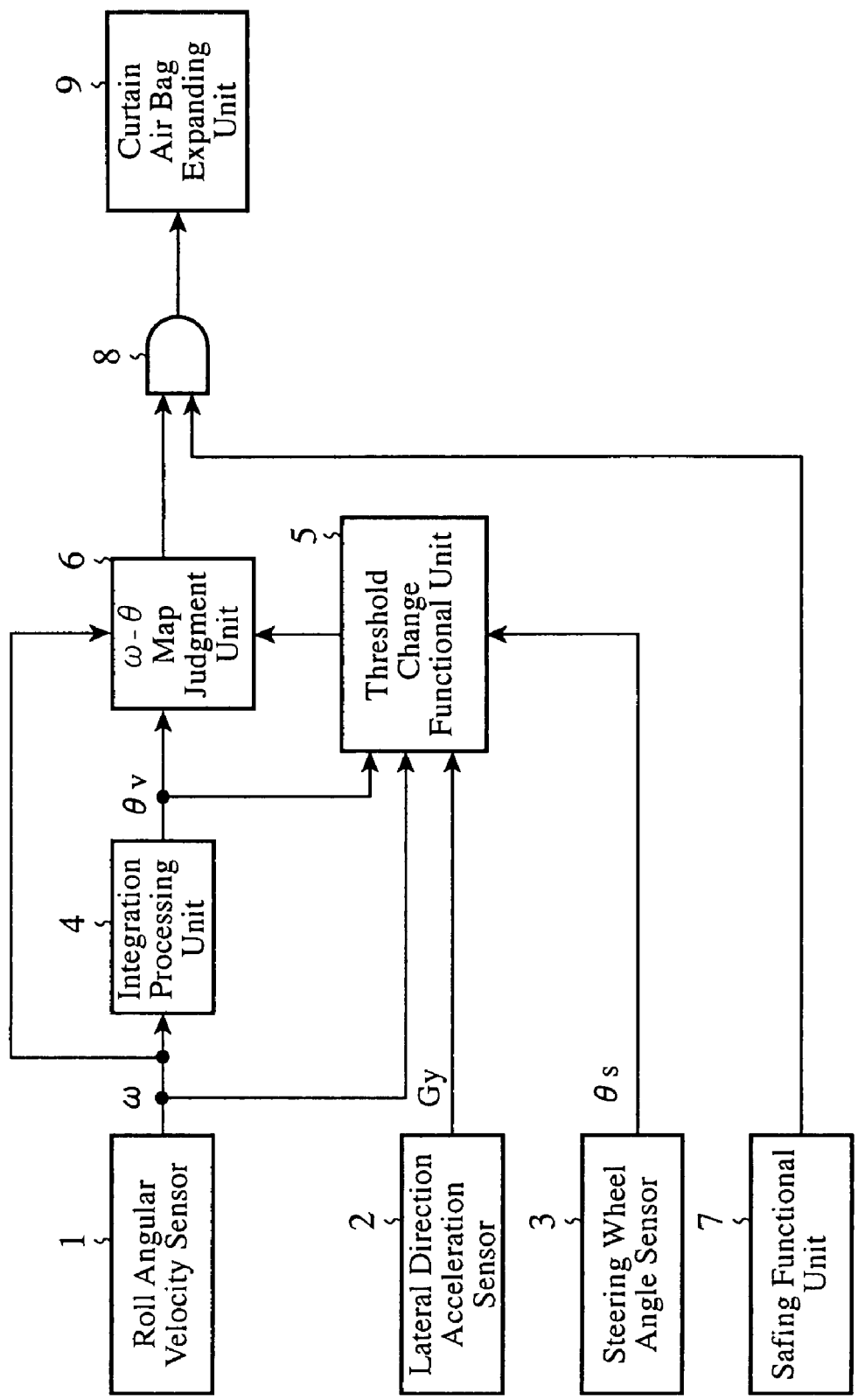
FIG. 1 is a block diagram showing a rollover judgment apparatus in accordance with embodiment 1 of the present invention.

FIG. 1 is a block diagram showing a rollover judgment apparatus in accordance with embodiment 1 of the present invention.

As shown in FIG. 1, the rollover judgment apparatus is provided with a roll angular velocity sensor 1 for detecting, as a roll angular velocity w, a rotation angle velocity around the longitudinal shaft of a vehicle, a lateral direction acceleration sensor 2 for detecting, as a lateral direction acceleration Gy, an acceleration of the vehicle operating in a lateral direction of the vehicle, a steering wheel angle sensor 3 for detecting a steering wheel angle θs, an integration processing unit 4 for integrating the roll angular velocity ω from the roll angular velocity sensor 1 so as to calculate a vehicle tilt angle θv, a threshold change functional unit 5 for changing a determination threshold on the basis of the outputs of the roll angular velocity sensor 1, lateral direction acceleration sensor 2, steering wheel angle sensor 3, and integration processing unit 4, i.e., the roll angular velocity ω, vehicle tilt angle θv, lateral direction acceleration Gy, and steering wheel angle θs, an ω-θ map judgment unit 6, as a rollover judging means, for judging whether or not the vehicle will roll over on the basis of the vehicle tilt angle θv from the integration processing unit 4 and an output from the threshold change functional unit 5 using an ω-θ map, a safing functional unit 7 for detecting a lift (i.e., a tip-up) of one or two tires on one side of the vehicle off a road surface, an AND circuit 8 for implementing an AND logical operation on an output of the ω-θ map judgment unit 6 and an output of the safing functional unit 7, and a curtain air bag deploying unit 9 for generating a command signal indicating expansion of a curtain air bag on the basis of an output of the AND circuit 8.

Figure 2:
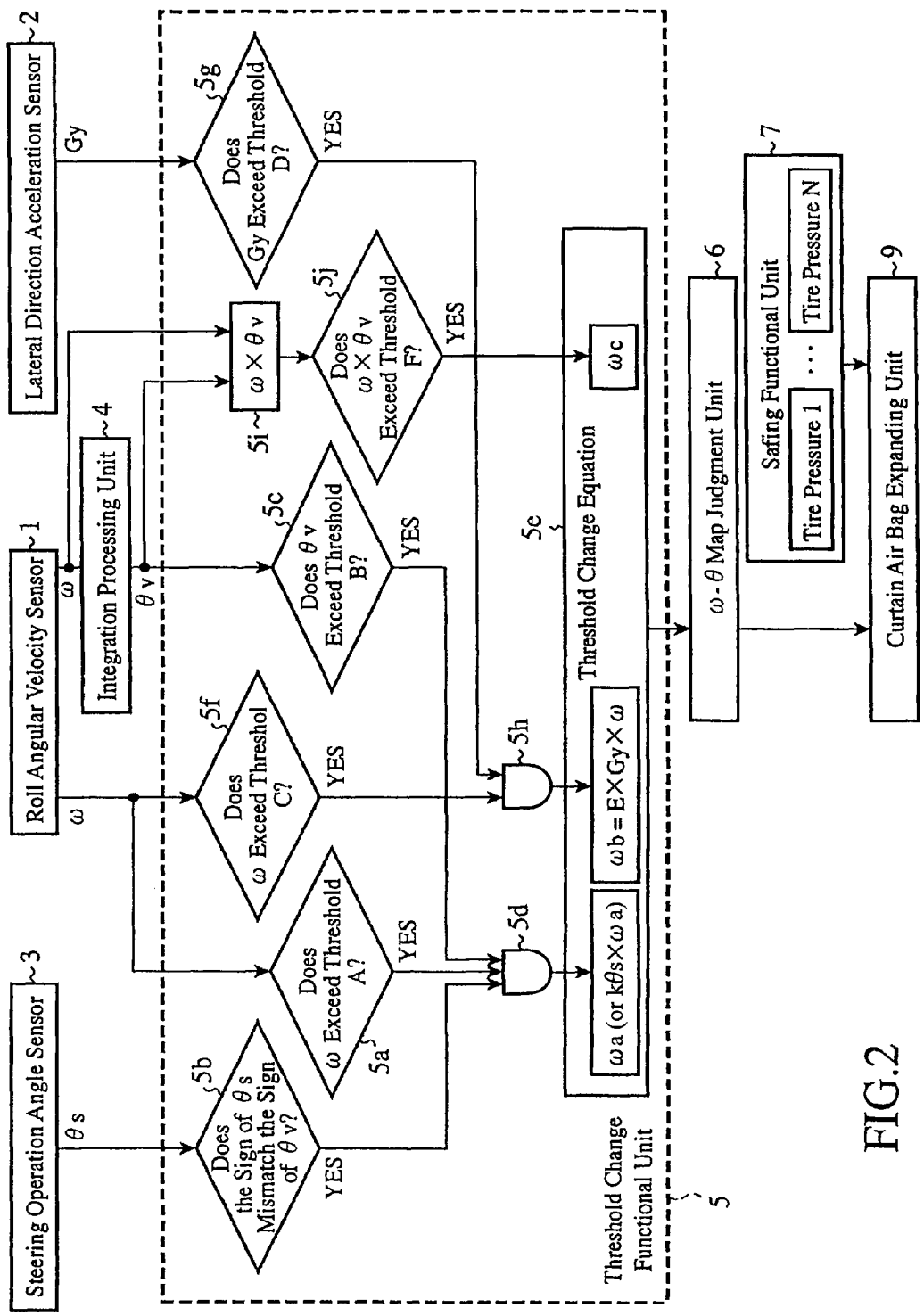
FIG. 2 is a block diagram showing a judgment algorithm which the rollover judgment apparatus in accordance with embodiment 1 of the present invention uses.

FIG. 2 is a block diagram showing a judgment algorithm which the rollover judgment apparatus in accordance with embodiment 1 of the present invention uses.

In FIG. 2, when the roll angular velocity ω from the roll angular velocity sensor 1, the steering wheel angle θs from the steering wheel angle sensor 3, and the vehicle tilt angle θv from the integration processing unit 4 are furnished to the threshold change functional unit 5, a judgment block 5a then judges that the roll angular velocity ω exceeds a threshold A, a judgment block 5b judges that the sign of the steering wheel angle θs does not agree with that of the vehicle tilt angle θv, and a judgment block 5c judges that the vehicle tilt angle θv exceeds a threshold B, the gate of an AND circuit 5d is opened so that a threshold change block 5e instructs the ω-θ map judgment unit 6 at the next stage to reduce a threshold ωth of the ω-θ map by ωa (deg/s).

That is, a portion of the threshold change block corresponding to the AND-circuit 5d reduces the threshold ωth of the ω-θ map by ωa (deg/s) (i.e., a first predetermined amount) when the tilt angle θv of the vehicle has a direction opposite to that of the steering wheel angle θs and the following conditions: ω>A (deg/s) (i.e., a first predetermined value) and θv>B (deg) (i.e., a second predetermined value) are satisfied. This operation corresponds to a prediction function which matches with a state in which the vehicle lifts off a road surface, glides through the air, and runs on a slope. In other words, a timing at which the steering wheel angle θs and tilt angle θv of the vehicle start increase in opposite directions is set to valid "1", whereas a timing at which the steering wheel angle θs and tilt angle θv of the vehicle start increase in the same direction is set to invalid "0". When ω and θ then exceed certain thresholds, respectively, the rollover judgment apparatus makes it possible to carry out early rollover judgment by reducing the determination threshold ωth by ωa.

In an alternative embodiment, at the time when ω and θ exceed their respective thresholds, the rollover judgment apparatus can reduce the determination threshold ωth by kθs×ωa (deg/s) (i.e., a second predetermined amount) according to the steering wheel angle θs as illustrated in FIG. 2. In other words, the rollover judgment apparatus can change the amount of reduction kθs×ωm (k=0 to 1) according to the steering wheel angle θs.

Next, when the roll angular velocity ω from the roll angular velocity sensor 1 and the lateral direction acceleration Gy from the lateral direction acceleration sensor 2 are furnished to the threshold change functional unit 5, a judgment block 5f judges that the roll angular velocity ω exceeds a threshold C, and a judgment block 5g judges that the lateral direction acceleration Gy exceeds a threshold D, the gate of an AND circuit 5h is opened so that the threshold change block 5e instructs the ω-θ map judgment unit 6 at the next stage to reduce the threshold ωth by E×Gy×ω=ωb (deg/s) (i.e., a third predetermined amount), where E is a constant.

That is, a portion of the threshold change block corresponding to the AND circuit 5h reduces the threshold ωth by E×Gy×ω=ωb (deg/s) (i.e., the third predetermined amount) when the following conditions: ω>C (deg/s) (i.e., a third predetermined value) and Gy>D (G) (i.e., a fourth predetermined value) are satisfied. This operation reflects a case in which the roll angular velocity ω increases after a lateral direction acceleration Gy has occurred in the vehicle. In this case, a time lag occurs in the meantime. This time lag differs according to the lateral direction acceleration Gy of the vehicle. Therefore, the rollover judgment apparatus enables early rollover judgment by computing Gy×ω so as to achieve synchronization between both the signals, and then subtracting a value proportional to the computation result from the threshold ωth. When the time lag is small in both the signals, Gy×ω is large and therefore there is a possibility that the vehicle will roll over, and the timing becomes early.

Next, when the roll angular velocity ω from the roll angular velocity sensor 1 and the vehicle tilt angle θv from the integration processing unit 4 are furnished to the threshold change functional unit 5, a multiplication block 5i multiplies the roll angular velocity ω by the vehicle tilt angle θv, and a judgment block 5j judges that the multiplication result ω×θv exceeds a threshold F, the threshold change block 5e instructs the ω-θ map judgment unit 6 at the next stage to reduce the threshold ωth by (θv×ω−P)×Q=ωc (deg/s), where P and Q are constants.

That is, the multiplication block 5i, judgment block 5j, and threshold change block 5e reduce the threshold nth by (θv×ω−P)×Q=ωc (deg/s) (i.e., a fifth predetermined amount) when the following condition: ω×θv>F (i.e., a seventh predetermined value) is satisfied. In other words, this operation corresponds to a threshold change function which is enabled when the lateral direction acceleration Gy of the vehicle is small, and the roll angular velocity ω and vehicle tilt angle θv of the vehicle are large. A time lag occurs when the vehicle tilt angle θv occurs whereas no time lag occurs when the roll angular velocity ω occurs, and this time lag has an influence upon a time-varying change in the roll angular velocity ω. Therefore, the rollover judgment apparatus makes it possible to carry out early rollover judgment by computing ω×θv, and subtracting the multiplication result which is calculated in a state in which the vehicle tilt angle θv is increasing from the threshold ωth.

Figure 3:
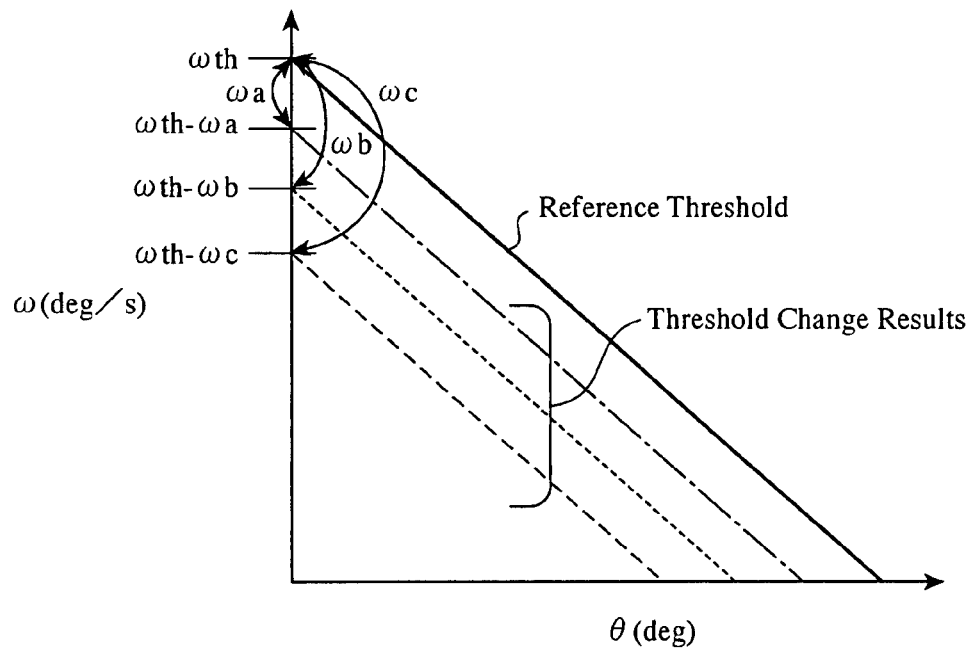
FIG. 3 is a diagram for explaining a change in a judgment threshold in the rollover judgment apparatus in accordance with embodiment 1 of the present invention.

FIG. 3 shows a state in which this threshold change functional unit 5 changes the determination threshold. In this FIG. 3, the vertical axis shows the roll angular velocity ω (deg/s) and the horizontal axis shows the roll angle θ (deg), and thresholds which are respectively changed from the threshold nth which is a reference threshold by a threshold ωa, a threshold ωb, and a threshold ωc are shown.

The ω–θ map judgment unit 6 then judges the ω–θ map on the basis of the threshold which has been changed by the threshold change block 5e of the threshold change functional unit 5, and the vehicle tilt angle θv from the integration processing unit 4. In this case, the ω–θ map judgment unit assigns the highest priority to the earliest timing of an expansion command. The safing functional unit 7 has a rollover safing function of monitoring the pressures of all the tires of the vehicle which are being used when the vehicle is traveling and performing a rollover safing operation when the pressure of one or more of the tires becomes below a preset value.

In other words, the safing functional unit 7 monitors the pressures of all the tires of the vehicle, and can therefore detect that the pressure of one or more of the tires decreases when the installation surface of the one or more of the tires with a road surface lifts off a road surface. When thus monitoring such a change in the pressure of any one of all the tires and then detecting decrease in the pressure of one or two tires on one side of the vehicle, the safing functional unit 7 can detect a tip-up phenomenon of the vehicle. Furthermore, when the pressures of the two tires on the front or back side of the vehicle decrease almost simultaneously, the safing functional unit 7 can detect that the vehicle is floating in the air. In this embodiment, the safing function of the safing functional unit 7 uses these detection processes.

The AND circuit 8 then implements an AND logical operation on the output of the ω–θ map judgment unit 6 and the output of the safing functional unit 7. That is, when both the outputs are "1", the gate of the AND circuit is opened and the curtain air bag deploying unit 9 produces a command of deploying an air bag so as to deploy the curtain air bag.

Figure 4:
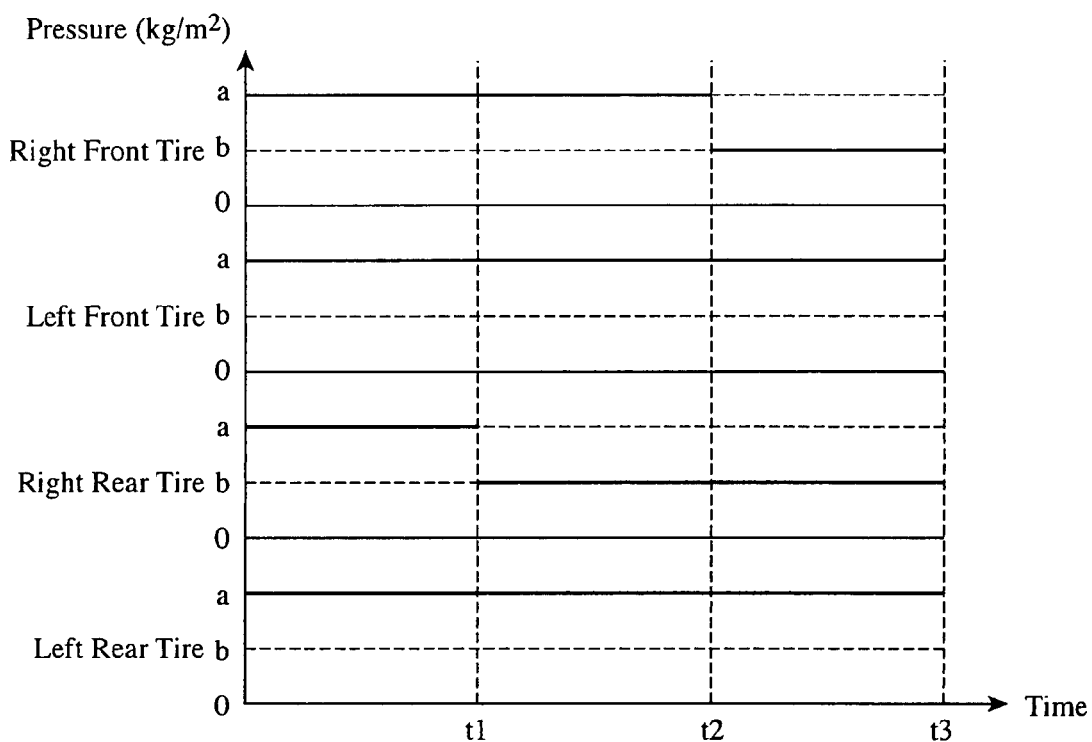
FIG. 4 is a diagram showing a tip-up detecting method using monitoring of the pressures of tires with a safing functional unit of the rollover judgment apparatus in accordance with embodiment 1 of the present invention.

FIG. 4 shows a tip-up detecting method using monitoring of the pressures of all the tires of the vehicle which the safing functional unit 7 of FIG. 2 uses.

In FIG. 4, a time interval from 0 to t1 corresponds a normal traveling state in which all the four wheels of the vehicle are in contact with a road surface, a time interval t1 to t2 corresponds to a state in which a tip-up has occurred and the right rear tire of the vehicle is floating above a road surface, and a time interval t2 to t3 corresponds to a state in which a tip-up has occurred and the two tires on the right side of the vehicle are floating in the air.

Figure 5:
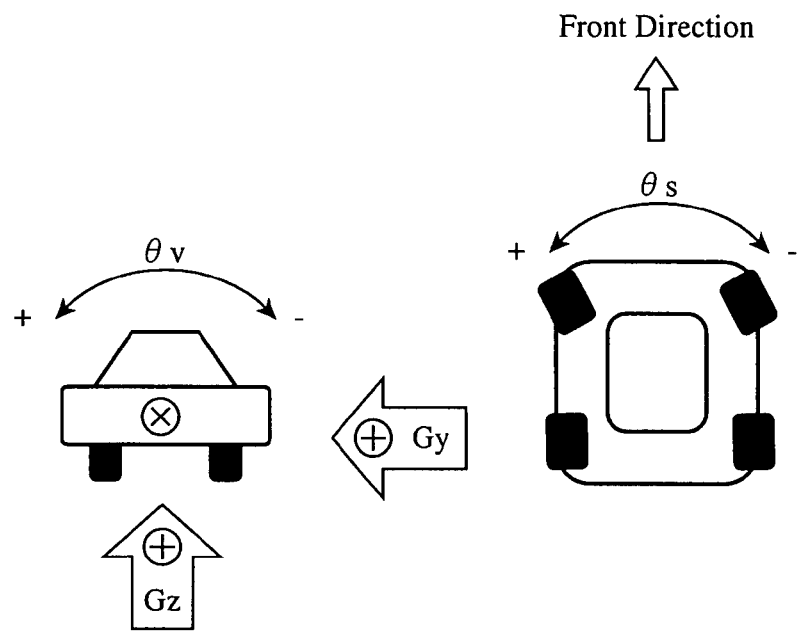
FIG. 5 is a diagram for explaining a vehicle tilt angle and a steering wheel angle in the rollover judgment apparatus in accordance with embodiment 1 of the present invention.

FIG. 5 shows the vehicle tilt angle θv and steering wheel angle θs.

As mentioned above, in accordance with this embodiment, the rollover prediction function is added to judgment of the ω–θ map so as to make the rollover judgment apparatus judge a possibility that the vehicle will roll over at an early time, so that the rollover judgment apparatus can deploy the curtain air bag normally. Furthermore, the rollover prediction function includes a step of extracting features representing the vehicle's behavior which agree with the rollover mode from ω, Gy, and the steering operation, and changing the judgment threshold line under certain conditions, thereby enabling early rollover judgment. In addition, the rollover prediction function includes a safing function of detecting a lift (or tip-up) of one or more tires on one side of the vehicle off a road surface, and a prediction function which matches with a state in which one or more tires of the vehicle lift off a road surface, glide through the air, and run on a slope.

Furthermore, the rollover judgment apparatus makes it possible to carry out early rollover judgment by computing Gy×ω so as to achieve synchronization between both the signals, and then subtracting a value proportional to the computation result from the threshold ωth. In addition, the rollover judgment apparatus makes it possible to carry out early rollover judgment by computing ω×θv, and subtracting the multiplication result which is calculated in a state in which the vehicle tilt angle θv is increasing from the threshold ωth. By further monitoring a change in the pressure of any one of all the tires and then detecting decrease in the pressure of one or two tires on one side of the vehicle, the rollover judgment apparatus can detect a tip-up phenomenon of the vehicle. Furthermore, when the pressures of the front and rear tires on the right or left side of the vehicle decrease almost simultaneously, the rollover judgment apparatus can detect that the vehicle is floating in the air.

Embodiment 2

Figure 6:
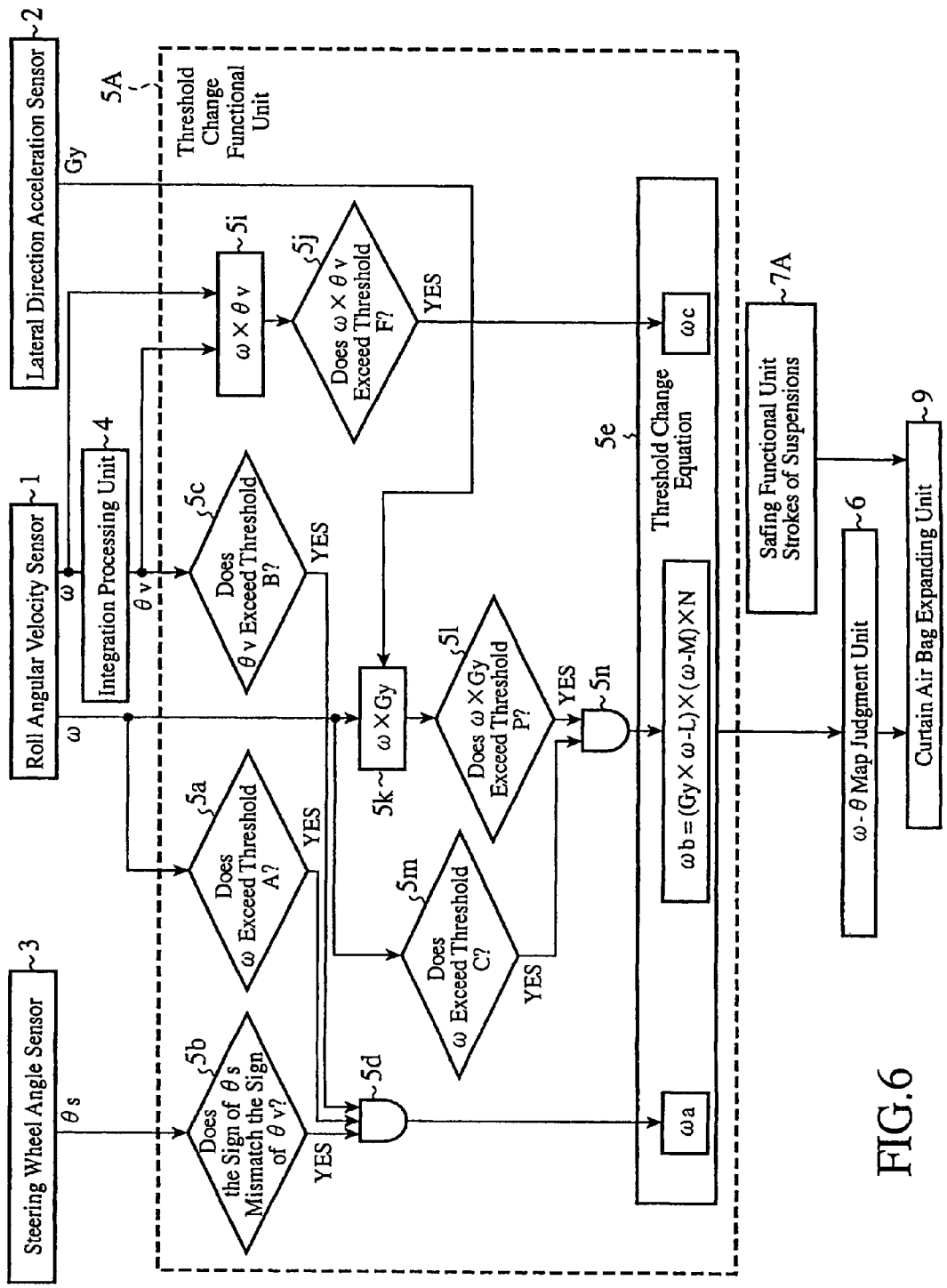
FIG. 6 is a block diagram showing a judgment algorithm which a rollover judgment apparatus in accordance with embodiment 2 of the present invention uses.

FIG. 6 is a block diagram showing a judgment algorithm which a rollover judgment apparatus in accordance with embodiment 2 of the present invention uses. The rollover judgment apparatus has a circuit structure which is substantially the same as that of the rollover judgment apparatus of above-mentioned embodiment 1 shown in FIG. 1, and therefore the description of the circuit structure will be omitted hereafter.

In FIG. 6, when a roll angular velocity ω from a roll angular velocity sensor 1, a steering wheel angle θs from a steering wheel angle sensor 3, and a vehicle tilt angle θv from an integration processing unit 4 are furnished to a threshold change functional unit 5A, a judgment block 5a then judges that the roll angular velocity ω exceeds a threshold A, a judgment block 5b judges that the sign of the steering wheel angle θs does not agree with that of the vehicle tilt angle θv, and a judgment block 5c judges that the vehicle tilt angle θv exceeds a threshold B, the gate of an AND circuit 5d is opened so that a threshold change block 5e instructs an ω–θ map judgment unit 6 at the next stage to reduce a threshold ωth of an ω–θ map by ωa (deg/s). This operation is the same as that in the case of FIG. 2.

Next, in accordance with this embodiment, when the roll angular velocity ω from the roll angular velocity sensor 1, and a lateral direction acceleration Gy from a lateral direction acceleration sensor 2 are furnished to the threshold change functional unit 5A, a multiplication block 5k multiplies the roll angular velocity ω by the lateral direction acceleration Gy, a judgment block 5l judges that the multiplication result ω×Gy exceeds a threshold P, and a judgment block 5m judges that the roll angular velocity ω exceeds a threshold C, the gate of an AND circuit 5n is opened so that the threshold change block 5e instructs the ω–θ map judgment unit 6 at the next stage to reduce the threshold ωth by ωb=(Gy×ω−L)×(ω−M)×N.

That is, a portion of the threshold change block corresponding to the AND circuit 5n reduces the threshold ωth by Gy×(ω−L)×(ω−M)×N=ωb (deg/s) (i.e., a fourth predetermined amount) when the following conditions: ω>C(deg/s) (i.e., a third predetermined value) and ω×Gy>P(G) (i.e., a fifth predetermined value) are satisfied. Thus, this embodiment offers an advantage of improving the accuracy of changing the judgment threshold by adding the constants L, M, and N. Thus, the rollover judgment device can easily support any type of vehicle by changing the constant L, M, and N. A portion of the threshold change block corresponding to multiplication blocks 5$i$ and 5$j$ is the same as that in the case of FIG. 2.

The $\omega$–$\theta$ map judgment unit 6 then judges the $\omega$–$\theta$ map on the basis of the threshold which has been changed by the threshold change block 5$e$ of the threshold change functional unit 5A, and the vehicle tilt angle $\theta v$ from the integration processing unit 4. In this case, the $\omega$–$\theta$ map judgment unit assigns the highest priority to the earliest timing of an expansion command. A safing functional unit 7 has a rollover safing function of monitoring the strokes of suspensions of the vehicle when the vehicle is traveling and judging that one or more of all the tires of the vehicle has lifted off a road surface when the stroke of one or more of the suspensions exceeds a preset threshold.

An AND circuit 8 (shown in FIG. 1) then implements an AND logical operation on the output of the $\omega$–$\theta$ map judgment unit 6 and the output of the safing functional unit 7A. That is, when both the outputs are "1", the gate of the AND circuit is opened and a curtain air back deploying unit 9 produces a command of deploying an air back so as to deploy the curtain air back.

Figure 7:
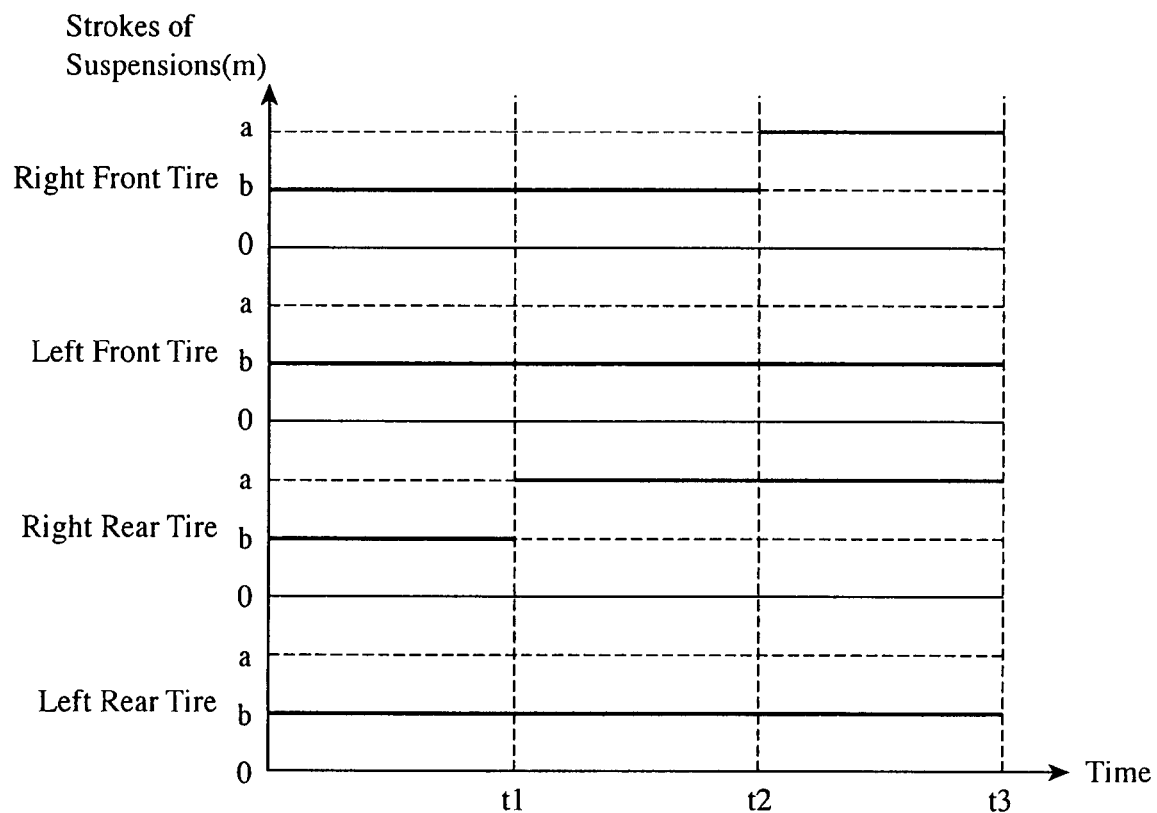
FIG. 7 is a diagram showing a tip-up detecting method using monitoring of the strokes of suspensions with a safing functional unit of the rollover judgment apparatus in accordance with embodiment 2 of the present invention.
Figure 8:
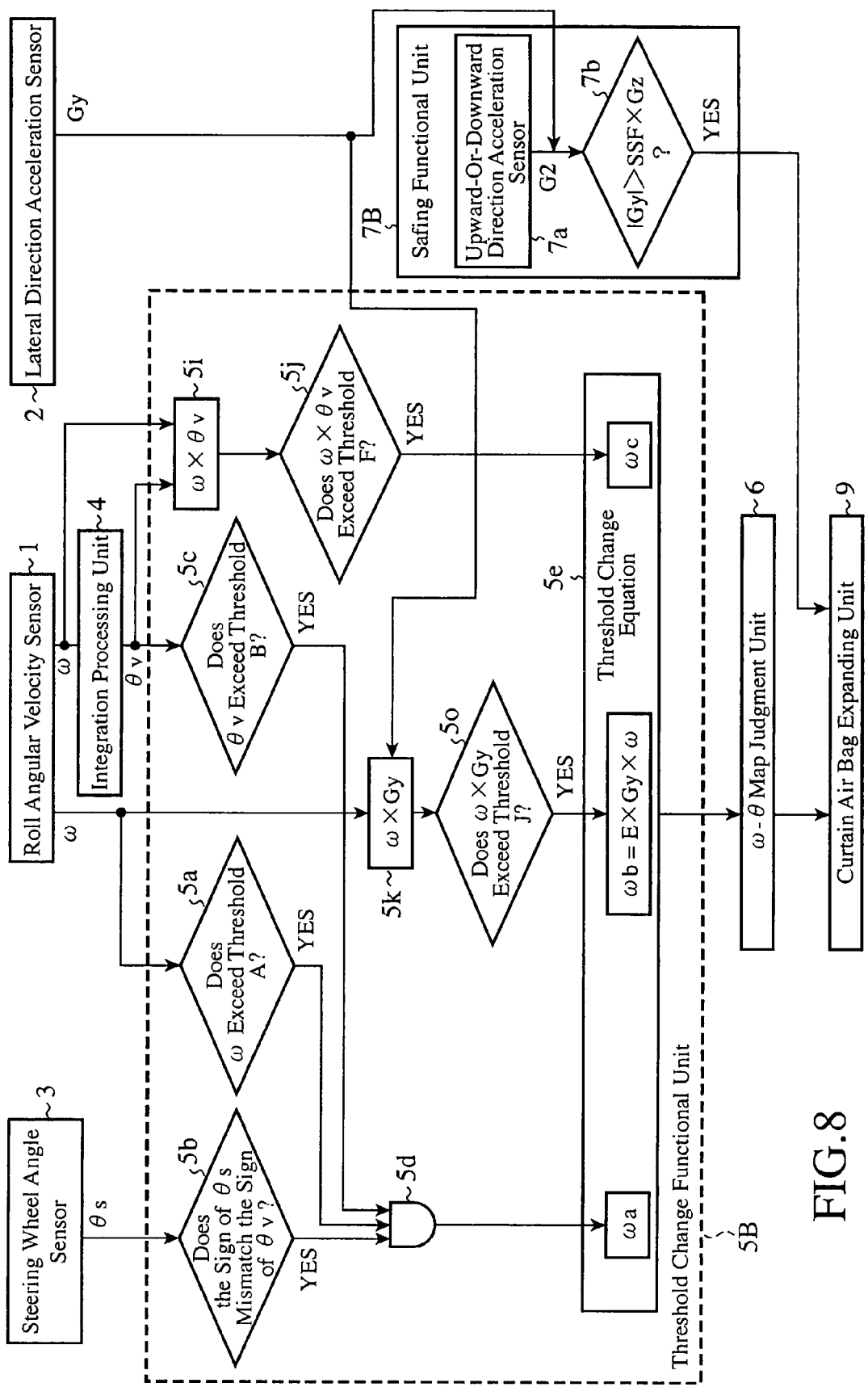
FIG. 8 is a block diagram showing a judgment algorithm which a rollover judgment apparatus in accordance with embodiment 3 of the present invention uses.

FIG. 7 shows a tip-up detecting method using monitoring of the strokes of the suspensions of the vehicle which the safing functional unit 7A of FIG. 8 uses.

In FIG. 7, a time interval from 0 to t1 corresponds a normal traveling state in which all the four wheels of the vehicle are in contact with a road surface, a time interval t1 to t2 corresponds to a state in which a tip-up has occurred and the right rear tire of the vehicle is floating above a road surface, and a time interval t2 to t3 corresponds to a state in which a tip-up has occurred and the two tires on the right side of the vehicle is floating in the air.

As mentioned above, like that of above-mentioned embodiment 1, the rollover judgment apparatus in accordance with this embodiment can deploy the curtain air bag normally, and makes it possible to carry out early rollover judgment. In addition, the rollover judgment apparatus has a safing function of detecting a lift (or tip-up) of one or more tires on one side of the vehicle off a road surface, and a prediction function which matches with a state in which one or more tires of the vehicle lift off a road surface, glide through the air, and run on a slope. Furthermore, the rollover judgment apparatus can have an improved accuracy of changing the judgment threshold by adding the constants L, M, and N, and can easily support any type of vehicle by changing the constants L, M, and N. In addition, the rollover judgment apparatus has a rollover safing function of monitoring the strokes of all the suspensions of the vehicle when the vehicle is traveling, and, when the stroke of one or more of the suspensions exceeds a preset threshold, performing corresponding rollover safing.

Embodiment 3

FIG. 8 is a block diagram showing a judgment algorithm which a rollover judgment apparatus in accordance with embodiment 3 of the present invention uses.

In FIG. 8, when a roll angular velocity $\omega$ from a roll angular velocity sensor 1, a steering wheel angle $\theta s$ from a steering wheel angle sensor 3, and a vehicle tilt angle $\theta v$ from an integration processing unit 4 are furnished to a threshold change functional unit 5B, a judgment block 5$a$ then judges that the roll angular velocity a exceeds a threshold A, a judgment block 5$b$ judges that the sign of the steering wheel angle $\theta s$ does not agree with that of the vehicle tilt angle $\theta v$, and a judgment block 5$c$ judges that the vehicle tilt angle $\theta v$ exceeds a threshold B, the gate of an AND circuit 5$d$ is opened so that a threshold change block 5$e$ instructs an $\omega$–$\theta$ map judgment unit 6 at the next stage to reduce a threshold $\omega$th of an $\omega$–$\theta$ map by $\omega a$ (deg/s). This operation is the same as that in the case of FIG. 2.

Next, in accordance with this embodiment, when the roll angular velocity $\omega$ from the roll angular velocity sensor 1 and a lateral direction acceleration Gy from a lateral direction acceleration sensor 2 are furnished to the threshold change functional unit 5B, a multiplication block 5$k$ multiplies the roll angular velocity $\omega$ by the lateral direction acceleration Gy, and a judgment block 5$o$ judges that the multiplication result $\omega \times Gy$ exceeds a threshold J, the threshold change block 5$e$ instructs the $\omega$–$\theta$ map judgment unit 6 at the next stage to reduce the threshold $\omega$th by $\omega b = E \times Gy \times \omega$, where E is a constant.

That is, a portion of the threshold change block corresponding to the judgment block 5$o$ reduces the threshold $\omega$th by $E \times Gy \times \omega = \omega b$ (deg/s) (i.e., a third predetermined amount) when the following condition: $Gy \times \omega > J$ (i.e., a sixth predetermined value) is satisfied. This operation reflects a case in which the roll angular velocity $\omega$ increases after a lateral direction acceleration Gy has occurred in the vehicle. In this case, a time lag occurs in the meantime. This time lag differs according to the lateral direction acceleration Gy of the vehicle. Therefore, the rollover judgment apparatus makes it possible to carry out early rollover judgment by computing $Gy \times \omega$ so as to achieve synchronization between both the signals, and then subtracting the value $E \times Gy \times \omega = \omega b$ (deg/s) which is proportional to the computation result from the threshold $\omega$th when $Gy \times \omega$ exceeds the threshold J.

A portion of the threshold change block corresponding to multiplication blocks 5$i$ and 5$j$ is the same as that in the case of FIG. 2.

The $\omega$–$\theta$ map judgment unit 6 then judges the $\omega$–$\theta$ map on the basis of the threshold which has been changed by the threshold change block 5$e$ of the threshold change functional unit 5B, and the vehicle tilt angle $\theta v$ from the integration processing unit 4. In this case, the $\omega$–$\theta$ map judgment unit assigns the highest priority to the earliest timing of an expansion command. A safing functional unit 7B has a rollover safing function of detecting an upward-or-downward direction acceleration Gz using an upward-or-downward direction acceleration sensor 7$a$, and judging that one or more of all the tires of the vehicle has lifted off a road surface when a judgment block 7$b$ judges that a ratio between the lateral direction acceleration Gy and the upward-or-downward direction acceleration Gz exceeds a preset threshold. In this case, the lateral direction acceleration sensor 2 and upward-or-downward direction acceleration sensor 7$a$ are mounted on the substrate of an ECU (not shown) so that a tip-up of the vehicle can be detected. Therefore, the structure of the rollover judgment apparatus can be simplified, the cost of the rollover judgment apparatus can be reduced, and the reliability of the rollover judgment apparatus can be improved.

A tip-up judgment equation which the safing functional unit 7B uses is given by $|Gy| > kGz$, where k is a constant. In other words, the tip-up judgment equation is expressed by $|Gy| > SSF(\approx k) \times Gz$, where SSF (Static Stability Factor)=T/2H, T is a tread width, and H is the height of the vehicle at its gravitational center.

An AND circuit 8 (shown in FIG. 1) then implements an AND logical operation on the output of the ω–θ map judgment unit 6 and the output of the safing functional unit 7B. That is, when both the outputs are "1", the gate of the AND circuit is opened and a curtain air back deploying unit 9 produces a command of deploying an air back so as to deploy the curtain air back.

Figure 9:
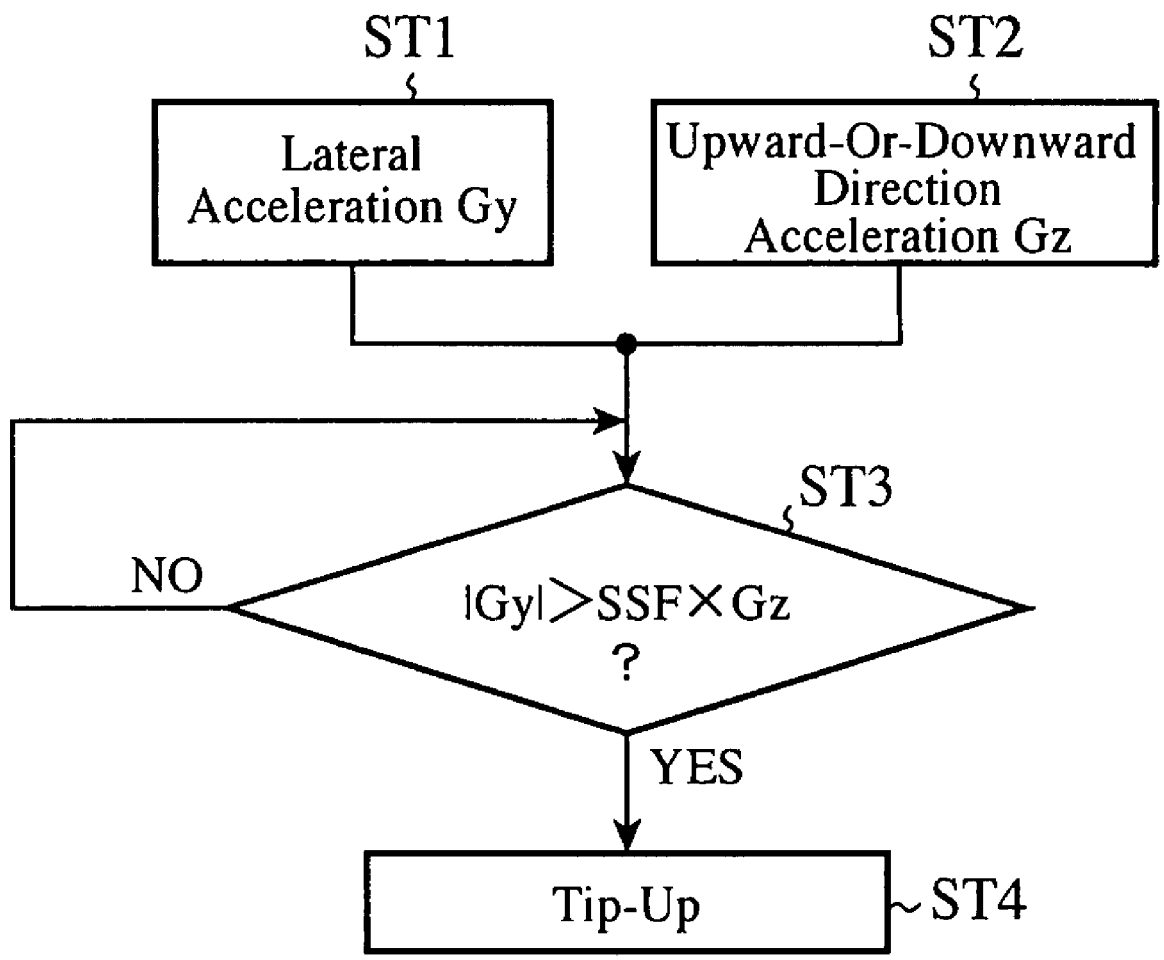
FIG. 9 is a flow chart showing a tip-up detecting method based on detection outputs of a lateral direction acceleration sensor and an upward-or-downward direction acceleration sensor in a safing functional unit of the rollover judgment apparatus in accordance with embodiment 3 of the present invention.

FIG. 9 shows a tip-up detecting method with comparison between the detection signal Gy from the lateral direction acceleration sensor 2 (shown in FIG. 1) and the detection signal Gz from the upward-or-downward direction acceleration sensor 7a in the safing functional unit 7B of FIG. 8.

In FIG. 9, the safing functional unit detects the lateral direction acceleration Gy from the lateral direction acceleration sensor 2 in step ST1, also detects the upward-or-downward direction acceleration Gz from the upward-or-downward direction acceleration sensor 7a in step ST2, and, when judging that the lateral direction acceleration Gy is larger than SSF×Gz in step ST3, judges that a tip-up is occurring in the vehicle, i.e., one or more tires on one side of the vehicle is floating above a road surface in step ST4.

A tip-up judgment equation used in this step ST4 is substantially given by |Gy|>kGz (k is a constant), and k=SSF (Static Stability Factor) in this equation and SST is given by SSF=T/2H (T: the tread width and H: the height of the vehicle at its gravitational center).

As mentioned above, like that of above-mentioned embodiment 1, also in accordance with this embodiment, the rollover judgment apparatus can deploy the curtain air bag normally. In addition, the rollover judgment apparatus has a safing function of detecting a lift (or tip-up) of one or more tires on one side of the vehicle off a road surface, and a prediction function which matches with a state in which one or more tires of the vehicle lift off a road surface, glide through the air, and run on a slope. Furthermore, the rollover judgment apparatus makes it possible to carry out early rollover judgment by computing Gy×ω so as to achieve synchronization between both the signals, and then subtracting the value E×Gy×ω=ωb (deg/s) which is proportional to the computation result from the threshold ωth when Gy×ω exceeds the threshold J. In addition, in the rollover judgment apparatus the lateral direction acceleration sensor Gy and upward-or-downward direction acceleration sensor Gz can be mounted on the substrate of an ECU so that a tip-up of the vehicle can be detected. Therefore, the structure of the rollover judgment apparatus can be simplified, the cost of the rollover judgment apparatus can be reduced, and the reliability of the rollover judgment apparatus can be improved. In above-mentioned embodiment, a steering acceleration can be used instead of the steering wheel angle. In this case, the steering acceleration can be calculated from a change in the steering wheel angle detected by the steering acceleration sensor.

INDUSTRIAL APPLICABILITY

As mentioned above, the rollover judgment apparatus in accordance with the present invention is suitable for use particularly with a vehicle-mounted curtain air bag because the rollover judgment apparatus adds a rollover prediction function to judgment of an ω–θ map so as to judge a possibility that the vehicle will roll over at an early time.

The invention claimed is:

1. A rollover judgment apparatus for judging whether or not a vehicle will roll over by comparing an output of a roll angular velocity sensor with a threshold, said device comprising:

a threshold change functional unit for
judging whether or not to change the determination threshold on a basis of a roll angular velocity, a tilt angle of the vehicle which is acquired by integrating the roll angular velocity, and at least one of: a lateral direction acceleration obtained from a lateral direction acceleration sensor, and a steering wheel angle obtained from a steering wheel angle sensor, and
changing the determination threshold in response to the judgment being made by the threshold change functional unit to change the determination threshold;
a rollover judging unit for judging whether or not the vehicle will roll over on a basis of the determination threshold, and said tilt angle of the vehicle;
a safing functional unit for detecting a tip-up of the vehicle in relation to a motion of the vehicle; and
a curtain air bag deploying unit for controlling expansion of a curtain air bag on a basis of an output of said rollover judging unit and an output of said safing functional unit,
wherein the rollover judging unit judges whether or not the vehicle will rollover by comparing the tilt angle to the unchanged determination threshold when the judgment is made by the threshold change functional unit not to change the determination threshold, and by comparing the tilt angle to the changed determination threshold when the judgment is made by the threshold change functional unit to change the determination threshold.

2. The rollover judgment apparatus according to claim 1, wherein said safing functional unit, when a ratio between said lateral direction acceleration and an upward-or-downward direction acceleration exceeds a predetermined threshold, judges that a tire of the vehicle has lifted off a ground.

3. The rollover judgment apparatus according to claim 1, wherein when said tilt angle of the vehicle has a direction opposite to that of said steering wheel angle, said roll angular velocity is larger than a predetermined value, and said tilt angle of the vehicle is larger than another predetermined value, said threshold change functional unit reduces the determination threshold by either a predetermined amount, or an amount based on said steering wheel angle.

4. The rollover judgment apparatus according to claim 1, wherein when said roll angular velocity is larger than a predetermined value, and said lateral direction acceleration is larger than another predetermined value, said threshold change functional unit reduces the determination threshold by a predetermined amount.

5. The rollover judgment apparatus according to claim 1, wherein when said roll angular velocity is larger than a predetermined value, and a product of said lateral direction acceleration and said roll angular velocity is larger than another predetermined value, said threshold change functional unit reduces the determination threshold by a predetermined amount.

6. The rollover judgment apparatus according to claim 1, wherein when a product of said lateral direction acceleration and said roll angular velocity is larger than a predetermined value, said threshold change functional unit reduces the determination threshold by a predetermined amount.

7. The rollover judgment apparatus according to claim 1, wherein when said roll angular velocity and said tilt angle of the vehicle are larger than a predetermined value, said threshold change functional unit reduces the determination threshold by a predetermined amount.

8. The rollover judgment apparatus according to claim 1, wherein said safing functional unit monitors pressures of all tires of the vehicle which are used when the vehicle is traveling, and, when the pressure of a tire becomes below a predetermined value, performs rollover safing.

9. The rollover judgment apparatus according to claim 1, wherein said safing functional unit monitors strokes of suspensions of the vehicle when the vehicle is traveling, and, when the stroke of a suspension exceeds a predetermined threshold, judges that a tire of the vehicle has lifted off a ground.

10. A rollover judgment apparatus for judging whether or not a vehicle will roll over by comparing an output of a roll angular velocity sensor with a threshold, said device comprising:
   a threshold change functional unit for
      judging whether or not to change the determination threshold on a basis of a roll angular velocity, a tilt angle of the vehicle which is acquired by integrating the roll angular velocity, and at least one of: a lateral direction acceleration obtained from a lateral direction acceleration sensor, and a steering acceleration which is acquired from a steering wheel angle sensed by a steering wheel angle sensor, and
      changing the determination threshold in response to a judgment being made by the threshold change functional unit to change the determination threshold;
   a rollover judging unit for judging whether or not the vehicle will roll over on a basis of the determination threshold changed by said threshold change functional unit, and said tilt angle of the vehicle;
   a safing functional unit for detecting a tip-up of the vehicle in relation to a motion of the vehicle; and
   a curtain air bag deploying unit for controlling expansion of a curtain air bag on a basis of an output of said rollover judging unit and an output of said safing functional unit,
   wherein the rollover judging unit judges whether or not the vehicle will rollover by comparing the tilt angle to the unchanged determination threshold when the judgment is made by the threshold change functional unit to change the determination threshold, and by comparing the tilt angle to the changed determination threshold when the judgment is made by the threshold change functional unit to change the determination threshold.

11. A rollover judgment method for judging whether or not a vehicle will roll over, comprising:
   utilizing a roll angular velocity sensor to obtain a roll angular velocity,
   utilizing at least one of a lateral direction acceleration sensor and a steering wheel angle sensor to obtain at least one of a lateral direction acceleration and a steering wheel angle;
   judging whether or not to change a determination threshold on the basis of the roll angular velocity, a tilt angle of the vehicle which is acquired by integrating the roll angular velocity, and at least one of: the lateral direction acceleration sensed by the lateral direction acceleration sensor, the steering wheel angle sensed by the steering wheel angle sensor, and a steering wheel acceleration which is acquired from the steering wheel angle;
   changing the determination threshold in response to the judgment being made to change the determination threshold;
   judging whether or not the vehicle will roll over on a basis of the determination threshold, and said tilt angle of the vehicle;
   detecting a tip-up of the vehicle in relation to a motion of the vehicle; and
   controlling expansion of a curtain air bag on a basis of the judgment of whether or not the vehicle will rollover and the detection of the tip-up of the vehicle,
   wherein the judgment of whether or not the vehicle will rollover is made by comparing the tilt angle to the unchanged determination threshold when the judgment is made by the threshold change functional unit not to change the determination threshold, and by comparing the tilt angle to the changed determination threshold when the judgment is made by the threshold change functional unit to change the determination threshold.

* * * * *